(12) United States Patent
Nalawadi et al.

(10) Patent No.: US 7,036,005 B2
(45) Date of Patent: Apr. 25, 2006

(54) METHOD AND APPARATUS FOR MODIFYING THE CONTENTS OF REVISION IDENTIFICATION REGISTER

(75) Inventors: Rajeev K. Nalawadi, Rancho Cordova, CA (US); Faraz A. Siddiqi, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 530 days.

(21) Appl. No.: 10/039,652

(22) Filed: Dec. 31, 2001

(65) Prior Publication Data

US 2003/0126421 A1 Jul. 3, 2003

(51) Int. Cl.
*G06F 12/14* (2006.01)

(52) U.S. Cl. .............................. 713/1; 713/2; 711/103; 711/113; 711/163; 365/196; 365/185.04

(58) Field of Classification Search .................... 713/1, 713/2; 711/103, 113, 163; 365/196, 185.04
See application file for complete search history.

(56) References Cited

U.S. PATENT DOCUMENTS

| | | | |
|---|---|---|---|
| 4,590,552 A * | 5/1986 | Guttag et al. ................ | 711/163 |
| 5,327,564 A * | 7/1994 | Little .......................... | 713/600 |
| 5,592,641 A * | 1/1997 | Fandrich et al. ............. | 711/103 |
| 5,596,738 A | 1/1997 | Pope | |
| 5,737,585 A | 4/1998 | Kaneshima | |
| 5,802,376 A * | 9/1998 | DeRoo et al. ............... | 710/200 |
| 5,815,731 A * | 9/1998 | Doyle et al. .................. | 710/10 |
| 5,826,075 A | 10/1998 | Bealkowski et al. | |
| 5,958,037 A * | 9/1999 | Dreyer et al. .................. | 712/32 |
| 5,991,197 A * | 11/1999 | Ogura et al. ............ | 365/185.11 |
| 6,012,145 A * | 1/2000 | Mathers et al. .............. | 713/202 |
| 6,148,384 A * | 11/2000 | Devanagundy et al. ...... | 711/163 |
| 6,405,311 B1 * | 6/2002 | Broyles et al. ................. | 713/2 |
| 6,671,785 B1 * | 12/2003 | Dalvi et al. .................. | 711/154 |
| 6,728,864 B1 * | 4/2004 | Lee et al. .................... | 712/200 |

FOREIGN PATENT DOCUMENTS

EP 0 472 433 A2 2/1992

\* cited by examiner

*Primary Examiner*—A. Elamin
(74) *Attorney, Agent, or Firm*—Blakely, Sokoloff, Taylor & Zafman LLP

(57) ABSTRACT

An embodiment for modifying the contents of a revision identification register includes a revision identification register that is both readable and writable (the contents of the revision identification register are modifiable). A revision identification modification bit is also included. The contents of the revision identification register are only modifiable when the revision identification modification bit is set to indicate that writes to the revision identification register will be accepted.

23 Claims, 3 Drawing Sheets

METHOD AND APPARATUS FOR MODIFYING THE CONTENTS OF REVISION IDENTIFICATION REGISTER

FIELD OF THE INVENTION

The present invention pertains to the field of computer systems. More particularly, this invention pertains to the field of revision identification registers.

BACKGROUND OF THE INVENTION

In a typical computer system, many of the computer system devices include revision identification registers that contain a value that indicates the current revision of the associated hardware. Typically, every time a device undergoes a revision (often referred to as a "stepping"), the value stored in the revision identification register is changed to reflect the new stepping. Prior computer system devices implement the revision identification registers as read-only registers. In other words, the contents of the revision identification registers are not modifiable.

When an operating system is loaded during a computer system boot process, the operating system typically checks the various revision identification registers to determine the current steppings of the various devices. The operating system uses the revision identification information to make decisions regarding which device drivers to load. When the operating system recognizes a new device stepping, the operating system loads an updated device driver for that device.

Computer systems typically include highly-integrated system logic devices often referred to as "chipsets". Theses system logic devices may include many functional units, and many of these functional units may include revision identification registers. Typically, when a highly-integrated system logic device undergoes a new stepping, most of the functional units do not have a change in functionality to warrant a change in the device driver. However, for each new stepping, each of the revision identification registers associated with the integrated functional units contain a value that reflects the new stepping. During the boot process, if the operating system detects a new device stepping, the operating system will load updated device drivers for the various functional units even if there is no change in functionality from the previous stepping to the current stepping.

The loading of updated drivers whether needed or not when a new stepping is detected poses difficulties for computer system manufacturers. Computer system manufacturers often build a pre-load of an operating system on one system and then moves it to an identical system that may have a system logic device with a different silicon stepping. Upon power-up, the operating system will load new device drivers even if not needed, thereby increasing manufacturing time.

The revision identification registers described above are often implemented in accordance with the Peripheral Component Interconnect (PCI) bus standard (Peripheral Component Interconnect Local Bus Specification, Rev. 2.2, released Dec. 18, 1998).

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

An embodiment for modifying the contents of a revision identification register includes a revision identification register that is both readable and writable (the contents of the revision identification register are modifiable). A revision identification modification bit is also included. The contents of the revision identification register are only modifiable when the revision identification modification bit is set to indicate that writes to the revision identification register will be accepted. This embodiment is useful in scenarios where the hardware is updated but the operating system device drivers need not be updated for a particular functional unit or particular functional units within a highly-integrated system logic device. In such cases, the pre-operating system boot software (such as the basic input/output system (BIOS) which is executed before the operating system is loaded), which is developed specifically for a particular computer system configuration, can make the decision to place an older revision identification value into the revision identification register before the operating system loads. The operating system assumes that the hardware has not changed. This prevents the unnecessary enumeration, search, and reloading of the device drivers, thereby saving manufacturing time.

Figure 1:
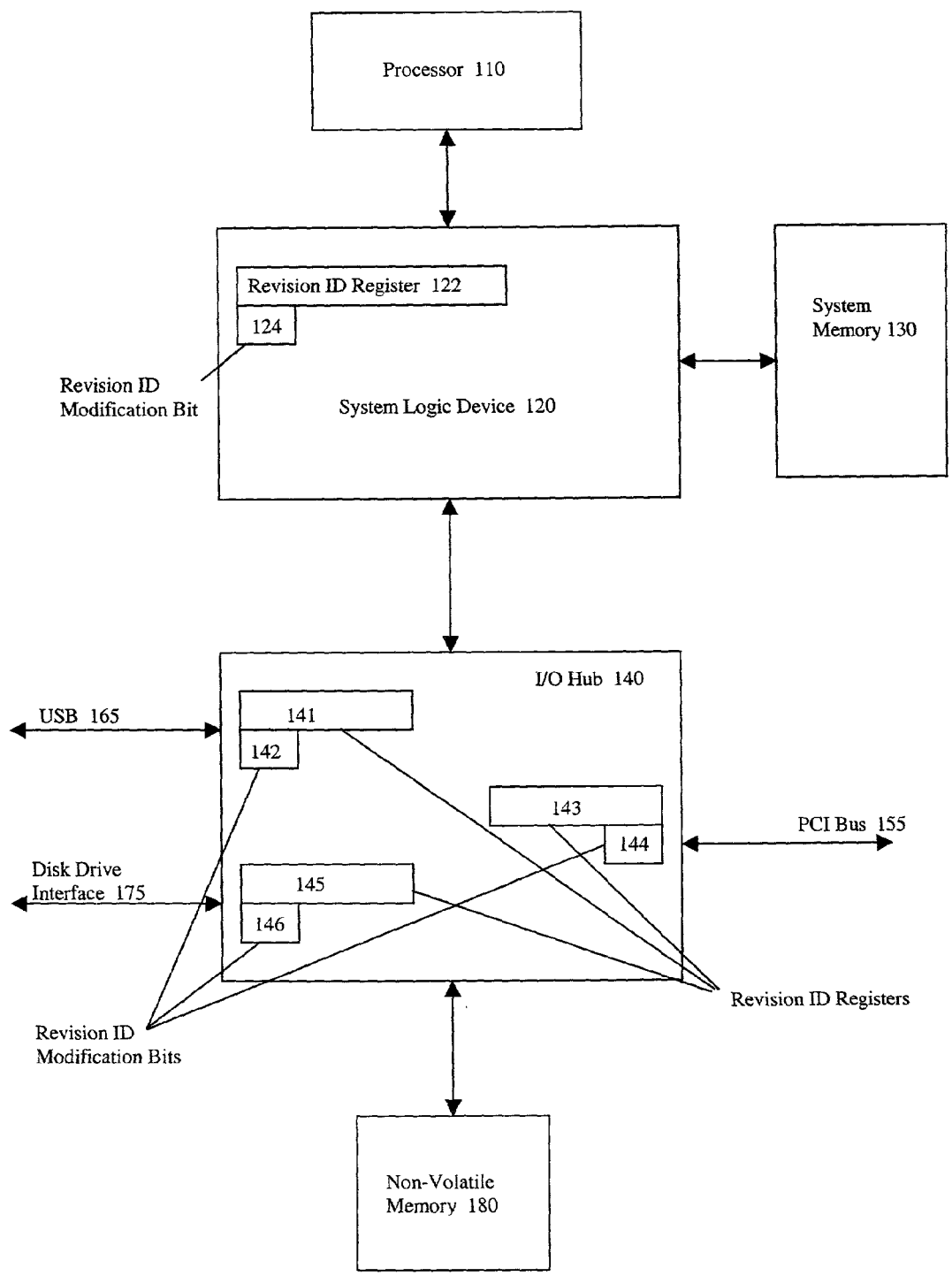
FIG. 1 is a block diagram of one embodiment of a computer system including modifiable revision identification registers.

FIG. 1 is a block diagram of one embodiment of a computer system including modifiable revision identification registers. The computer system of FIG. 1 includes a processor 110. The processor 110 is coupled to a system logic device 120. The system logic device 120 may include a memory controller for communicating with a system memory 130. The system logic device 120 may also include other functional units including a graphics controller.

The system logic device 120 is also coupled to an input/output hub 140. The input/output hub 140 may include a variety of functional units, including, but not limited to, functional units that provide communication with a universal serial bus (USB) 165, a PCI bus 155, and a disk drive interface 175. The disk drive interface 175 may communicate with a storage device (not shown) that has stored thereon an operating system. All or part of the operating system may be loaded into the system memory 130 during the computer system boot process.

The input/output hub 140 is also coupled to a non-volatile memory 180. The non-volatile memory 180 may store a basic input/output system (BIOS) or other pre-operating system software. As used herein, the term "pre-operating system software" is meant to include any software agents that are executed prior to the operating system loading during the system boot process.

The computer system of FIG. 1 includes a number of revision identification registers. The system logic device 120 includes a revision identification register 122 and a revision identification modification bit 124. When the revision identification modification bit 124 is set to the value "1", the revision identification register 122 will accept writes. When the revision modification bit 124 reflects a value of "0", the revision identification register 122 is read-only (will not accept writes).

The input/output hub 140 includes revision identification registers 141, 143, and 145. The input/output hub 140 also includes revision identification modification bits 142, 144, and 146. The revision identification register 141 and the revision identification modification bit 142 are associated with the functional unit that provides communication with the USB 165. The revision identification register 143 and the revision identification modification bit 144 are associated with the functional unit that provides communication with the PCI bus 155. The revision identification register 145 and the revision identification modification bit 146 are associated with the functional unit that provides communication with the disk drive interface 175. Many other possible embodiments exist where revision identification registers and revision identification modification bits are associated with any of a wide range of functional units or devices.

As with the revision identification register 122 and the revision identification modification bit 124, the revision identification registers 141, 143, and 145 are not modifiable when their associated revision identification modification bits 142, 144, and 146 contain the value "0". When the revision identification modification bits 142, 144, and 146 are set to the value "1", the associated revision identification registers 141, 143, and 145 are modifiable. That is, the revision identification registers 141, 143, and 145 will accept writes.

The pre-operating system software stored in the non-volatile memory 180 may include code that checks the current values stored in the various revision identification registers. This code can determine whether to replace the current revision identification register values with values that reflect previous device steppings.

For this example embodiment, the revision identification registers 122, 141, 143, and 145 and the revision identification modification bits 124, 142, 144, and 146 may be included as part of the PCI configuration spaces associated with the various associated devices or functional units.

Although example embodiments described herein discuss a revision identification modification bit for determining whether an associated revision identification register is modifiable, other embodiments are possible using more than one bit.

Further, although example embodiments described herein include revision identification modification bits where a value of "1" indicates that an associated revision identification register is modifiable and a value of "0" indicates a read-only state for the revision identification register, other embodiments are possible where a value of "0" indicates that an associated revision identification register is modifiable and a value of "1" indicates a read-only state for the revision identification register.

Figure 2:
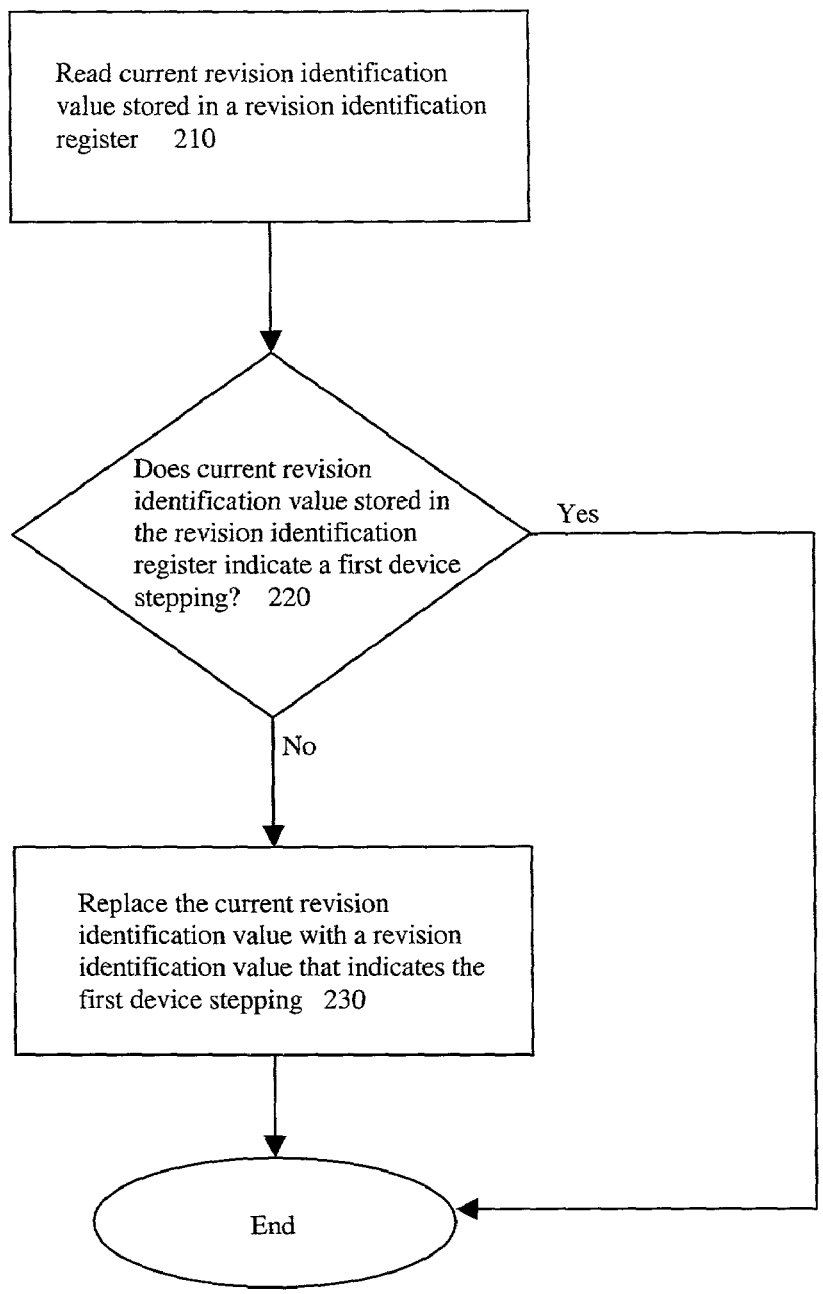
FIG. 2 is a flow diagram of one embodiment of a method for modifying a value stored in a revision identification register.

FIG. 2 is a flow diagram of one embodiment of a method for modifying a value stored in a revision identification register. At block 210, a current revision identification register value is read from a revision identification register. A check is made at block 220 to determine whether the current revision identification value indicates a first device stepping. This first device stepping may be the last stepping where any significant changes in functionality occurred. The term "first device stepping" does not necessarily mean the original version of a device or functional unit.

If the current revision identification value indicates the first device stepping, then no further action is taken. However, if the current revision identification value does not indicate the first device stepping, then at block 230 the current revision identification value is replaced with a value that indicates the first device stepping.

Figure 3:
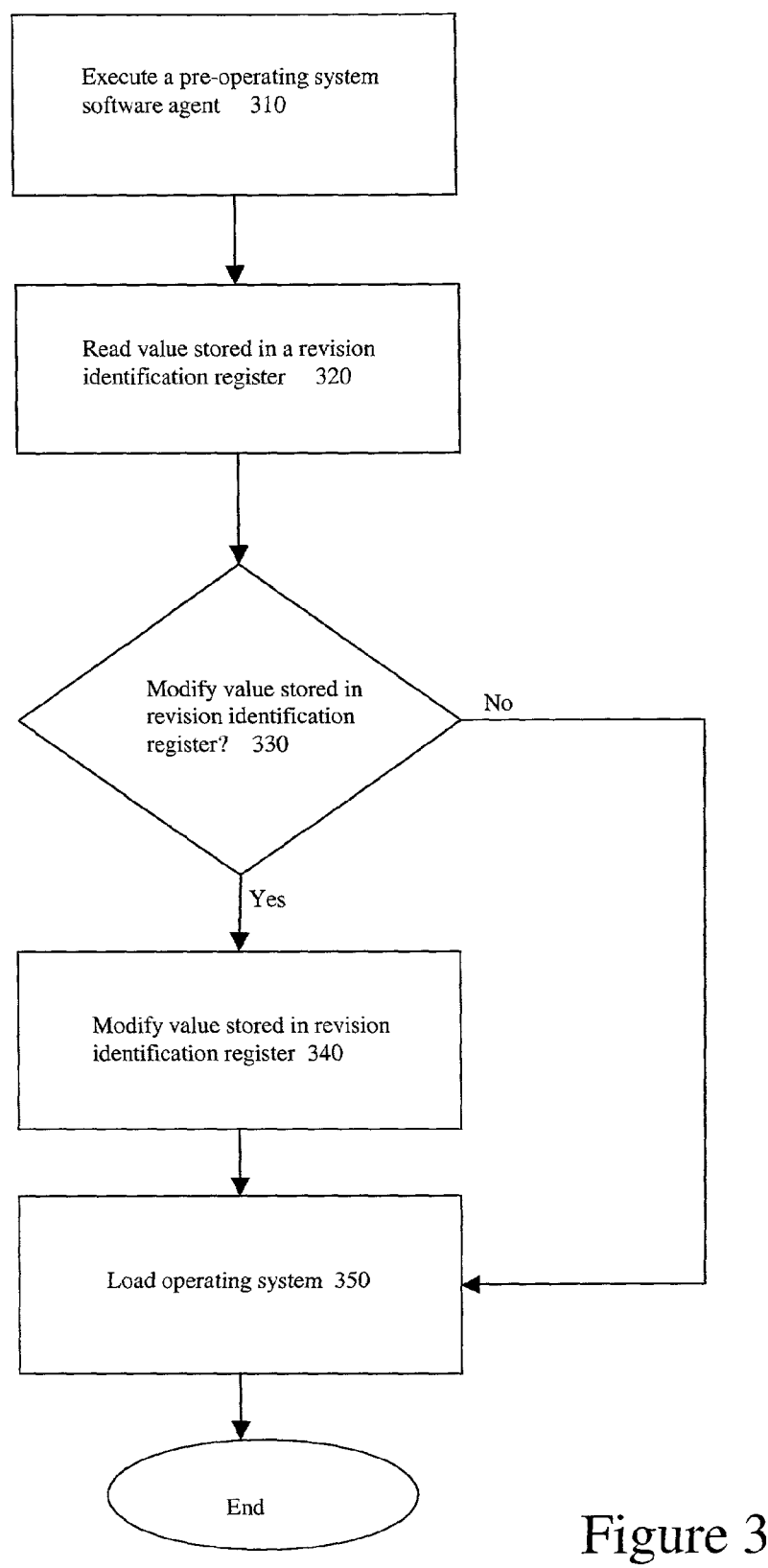
FIG. 3 is a flow diagram of an additional embodiment of a method for modifying a value stored in a revision identification register.

FIG. 3 is a flow diagram of an additional embodiment of a method for modifying a value stored in a revision identification register. At block 310, a pre-operating system software agent is executed. At block 320, a value stored in a revision identification register is read. At block 330, a determination is made as to whether to modify the value stored in the revision identification register. If the determination is made to not modify the value stored in the revision identification register, then at 350 an operating system is loaded. If the determination is made to modify the value stored in the revision identification register, then the value is modified at block 340 before loading the operating system at block 350. The operations indicated at blocks 320, 330, and 340 are performed under control of the pre-operating system software agent.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. An apparatus, comprising:
   a revision identification register to store a revision identification value of the apparatus, and
   a revision identification modification register, the revision identification modification register to allow modification of the revision identification register contents when indicated by the contents of the revision identification modification register.

2. The apparatus of claim 1, wherein the revision identification modification register includes a single bit, the state of the bit indicating whether the contents of the revision identification register are currently modifiable.

3. The apparatus of claim 2, wherein a value of "1" in the revision identification modification register indicates that the revision identification register will accept any value written to the revision identification register.

4. The apparatus of claim 3, wherein a value of "0" in the revision identification modification register indicates that the revision identification register will ignore any writes to the revision identification register.

5. A method, comprising:
   determining whether a current revision identification value stored in a revision identification register indicates a first device stepping;
   ensuring that a revision identification modification register contains a value that indicates that the revision identification register will accept writes; and replacing the current revision identification value with a revision identification value that indicates the first device stepping if the current revision identification value does not indicate the first device stepping.

6. The method of claim 5, further comprising:

placing a value in the revision identification modification register that indicates that the revision identification register will not accept writes, the placing a value in the revision identification modification register occurring following replacing the current revision identification value with a revision identification value that indicates the first device stepping.

7. A method, comprising:

executing a pre-operating system software agent, the pre-operating software agent to determine whether a value stored in a revision identification register indicates a first device stepping;

accessing a revision identification modification register;

modifying the value stored in the revision identification register to indicate the first device stepping if modification of the revision identification register is enabled according to contents of the revision identification modification register and the value stored in the revision identification register indicates an updated device stepping; and loading an operating system.

8. The method of claim 7, wherein modifying the value stored in the revision identification register includes replacing the value stored in the revision identification register with a value that indicates the first device stepping if the value stored in the revision identification register does not indicate the first device stepping.

9. A machine-readable medium having stored thereon instructions which, when executed by a computer system, causes the computer system to perform a method comprising:

determining whether a current revision identification value stored in a revision identification register indicates a first device stepping;

ensuring that a revision identification modification register contains a value that indicates that the revision identification register will accept writes; and replacing the current revision identification value with a revision identification value that indicates the first device stepping if the current revision identification value does not indicate the first device stepping.

10. The machine readable medium of claim 9 having stored thereon additional instructions which, when executed, perform:

placing a value in the revision identification modification register that indicates that the revision identification register will not accept writes, the placing a value in the revision identification modification register occurring following replacing the current revision identification value with the revision identification value that indicates the first device stepping.

11. A machine-readable medium having stored thereon instructions which, when executed by a computer system, causes the computer system to perform a method comprising:

executing a pre-operating system software agent, the pre-operating software agent to determine whether -a value stored in a revision identification register indicates a first device stepping;

accessing a revision identification modification register;

modifying the value stored in the revision identification register to indicate the first device stepping if modification of the revision identification register is enabled according to contents of the revision identification modification register and the value stored in the revision identification register indicates an updated device stepping; and loading an operating system.

12. The machine readable medium of claim 11, wherein modification of the revision identification register is enabled if the value stored in the revision identification register does not indicates a first device stepping.

13. The machine readable medium of claim 12, wherein modifying the value stored in the revision identification register includes replacing the value stored in the revision identification register with a value that indicates the first device stepping if the value stored in the revision identification register does not indicate the first device stepping.

14. A system, comprising:

a processor;

a system logic device coupled to the processor, the system logic device comprising:

at least one functional unit coupled via a communications link with a device, the functional unit including:

a revision identification register to store a revision identification value of the device; and a revision identification modification register, the revision identification modification register to allow modification of the revision identification register contents when indicated by the contents of the revision identification modification register; and a non-volatile memory to store a pre-operating system software agent, the pre-operating software agent to determine whether to modify an updated device stepping stored in the revision identification register with a first device stepping.

15. The system of claim 14, wherein the revision identification modification register includes a single bit, the state of the bit indicating whether the contents of the revision identification register are currently modifiable.

16. The system of claim 15, wherein a value of "1" in the revision identification modification register indicates that the revision identification register will accept any value written to the revision identification register.

17. The system of claim 16, wherein a value of "0" in the revision identification modification register indicates that the revision identification register will ignore any writes to the revision identification register.

18. A system logic device, comprising:

at least one functional unit coupled via a communications link with a device, the functional unit including:

a revision identification register to store a revision identification value of the device, and a revision identification modification register, the revision identification modification register to allow modification of the revision identification register contents when indicated by the contents of the revision identification modification register to restore the revision identification value of the device.

19. The system logic device of claim 18, wherein the system logic device comprises a chipset.

20. The system logic device of claim 19, wherein the chipset comprises an input/output (I/O) controller hub.

21. The system logic device of claim 20, wherein the chipset further comprises a memory controller hub coupled to the I/O controller hub.

22. A method comprising:
accessing configuration registers of a device to determine whether a value stored in a revision identification register indicates an updated device stepping;
accessing a revision identification modification register of the configuration registers to determine whether contents of the revision identification modification register indicate that the revision identification register will accept writes; and
restoring the value within the revision identification register to indicate a first device stepping if the revision identification modification register contents indicate that the revision identification register will accept writes.

23. A bus device comprising:
a plurality of configuration registers, the plurality of configuration registers including a revision identification register to store a revision identification value of the bus device, and a revision identification modification register, the revision identification modification register to allow modification of the revision identification register contents when indicated by contents of the revision identification modification register.

* * * * *